United States Patent [19]

Honma et al.

[11] Patent Number: 4,541,975
[45] Date of Patent: Sep. 17, 1985

[54] METHOD FOR PRODUCING HIGH STRENGTH SINTERED SILICON CARBIDE

[75] Inventors: Katsuhiko Honma, Akashi; Tsuneo Tatsuno, Kobe; Hiroshi Okada, Amagasaki, all of Japan

[73] Assignee: Kabushiki Kaisha Kobe Seiko Sho, Kobe, Japan

[21] Appl. No.: 388,657

[22] Filed: Jun. 15, 1982

[30] Foreign Application Priority Data

Jun. 17, 1981 [JP] Japan .................. 56-94386

[51] Int. Cl.$^4$ ............................................. C04B 41/06
[52] U.S. Cl. ..................... 264/62; 264/65; 264/82; 264/570; 428/698; 501/92
[58] Field of Search ............ 264/65, 82, 85, DIG. 50, 264/570, 62; 501/88, 92; 428/698

[56] References Cited

U.S. PATENT DOCUMENTS

| | | | |
|---|---|---|---|
| 2,609,318 | 9/1952 | Swentzel | 428/698 |
| 4,094,672 | 6/1978 | Fleck et al. | 264/DIG. 50 |
| 4,187,344 | 2/1980 | Fredriksson | 428/698 |
| 4,296,065 | 10/1981 | Ishii et al. | 264/332 |

FOREIGN PATENT DOCUMENTS 1304291 1/1973 United Kingdom .................. 264/85

OTHER PUBLICATIONS

Kobe Steel, Ltd., No. 313011, Hot and Cold Isostatic Pressing Equipment, pp. 1–10.
Kobe Steel, Ltd., No. 428090, Hot Isostatic Press, pp. 1–6.

Primary Examiner—James Derrington
Attorney, Agent, or Firm—Oblon, Fisher, Spivak, McClelland & Maier

[57] ABSTRACT

A method for producing a high strength sintered silicon carbide, the method comprising: molding a mixture of silicon carbide powder and a sintering aid into a green compact of a predetermined shape: preliminarily sintering the green compact to obtain a preliminarily sintered compact having a relative density higher than 80%; charging the preliminarily sintered compact in a HIP equipment without using a capsule; and subject the preliminarily sintered compact to a HIP treatment in a high-temperature and high-pressure $N_2$ gas atmosphere maintaining a pressure higher than 500 atms and a temperature in the range of 1400°–2300° C.

5 Claims, 5 Drawing Figures

○ SiC
△ $Si_3N_4$

PRIOR TO HIP      Ar-HIP     $N_2$-HIP

METHOD FOR PRODUCING HIGH STRENGTH SINTERED SILICON CARBIDE

BACKGROUND OF THE INVENTION (1) Field of the Invention

This invention relates to a method for producing high strength sintered silicon carbide, and more particularly to a method for producing high strength sintered silicon carbide by a hot isostatic pressing treatment (hereinafter referred to as "HIP" for brevity) in a nitrogen gas atmosphere of preliminarily sintered silicon carbide.

(2) Description of the Prior Art

Recently great concern is directed to non-oxide ceramics like silicon nitride ($Si_3N_4$) and silicon carbide (SiC) which are superior to the conventional oxide ceramics as represented by alumina ($Al_2O_3$) in high temperature strength and resistance, for their possibilities of providing good heat resistant structural materials in the future for gas turbines, Diesel engines and heat exchangers which are operated at high temperatures.

However, in spite of the above-mentioned excellent physical properties, the non-oxide ceramics like $Si_3N_4$ and SiC have a number of problems to be solved before actual application, arousing instensive studies in various research organizations in and outside this country. One of the most important problems which are involved in this regard is the establishment of the technology of producing parts of high strength and complicated shapes. Although vigorous research activities are directed particularly to $Si_3N_4$ these days, it is found difficult to sinter $Si_3N_4$ alone due to its strong covalent bonding property. Therefore attempts have been made to densify it with a small amount of sintering aid by hot press sintering, ordinary sintering or reaction sintering. However, these attempts respectively have own merits and demerits and they have not yet arrived at the establishment of any satisfactory method.

On the other hand, in step with the recent development of the molding by the hot isostatic pressing (HIP), it has been considered to apply the HIP molding techniques to the $Si_3N_4$ sintering. For example, Larker et al reported in HIGH PRESSURE SCIENCE AND TECHNOLOGY, vol. 12 (1972) that, even when the additive amount of yttrium oxide ($Y_2O_3$) as a sintering aid was 0.5 wt %, it was possible to obtain sintered products of theoretical density by subjecting rubber-pressed $Si_3N_4$ compacts to a HIP treatment in argon gas atmosphere after sealing them in a quartz glass container. Further, Shimada presented the results of his survey on the relationship between the densification of HIP-treated material and crystal phase of $Si_3N_4$ in his paper for a seminar relating to "HIP technology and it use" in 1980, HIP-treating $Si_3N_4$ powder in a manner similar to Larker et al after adding various kinds of sintering aids.

These methods, however, require to use a glass container or the like in the HIP treatment so that it still takes some time before their application for solving a number of problems, e.g., means for producing containers of complicated shapes, a method for uniformly filling $Si_3N_4$ in the container, a method for preventing reaction between $Si_3N_4$ and the container, and a method for detaching the $Si_3N_4$ from the container.

Under these circumstances, the applicants proposed in their prior application a method for producing high strength sintered $Si_3N_4$ with a relative density higher than 98%, by compacting $Si_3N_4$ powder into a predetermined shape, preliminarily sintering the resulting green compact to a relative density of 92% and then subjecting the preliminarily sintered compact to a HIP treatment at a temperature higher than 1500° C. and under direct action of a hot high-pressure gas with a partial nitrogen gas pressure higher than 500 atms.

In contrast to the energetic activities for the development of a HIP process which is applicable to $Si_3N_4$, there have thus far been made almost no proposals with regard to the application of HIP to SiC which belongs to the same non-oxide ceramics. However, it should be recognized that the application of the HIP treatment to SiC has the same importance as it has to $Si_3N_4$ in consideration of potential utility of SiC.

SUMMARY OF THE INVENTION

In view of the foregoing situations, the present inventors conducted studies on the HIP treatment, contemplating establishment of a method for producing high strength sintered SiC. More particularly, the present invention has as its object to provide a method for producing high strength sintered silicon carbide of complicated shape by a HIP treatment.

According to the invention, this objective is achieved by a method which has been developed on the basis of the finding that, upon decomposition to Si and C at a high temperature, the surface layer of SiC is partly converted to $Si_3N_4$ by $N_2$ gas of the pressure medium, forming thereon an $Si_3N_4$ rich layer which contributes to the improvement of strength. In a preferred form of the invention, the method comprises: molding a mixture of silicon carbide powder and a sintering aid into a green compact of a predetermined shape; preliminarily sintering the green compact to obtain a preliminarily sintered compact having a relative density higher than 80%; and subjecting the preliminarily sintered compact to a HIP treatment in a furnace containing a high-temperature and high-pressure nitrogen gas atmosphere maintaining a pressure higher than 500 atms and a temperature in the range of 1400° to 2300° C. thereby to form $Si_3N_4$ rich layers on the surfaces of silicon carbide as promptly as possible. The above and other objects, features and advantages of the present invention will become apparent from the following description and appended claims, taken in conjunction with the accompanying drawing.

DETAILED DESCRIPTION OF THE PREFERRED EMBODIMENTS

Figure 1A:
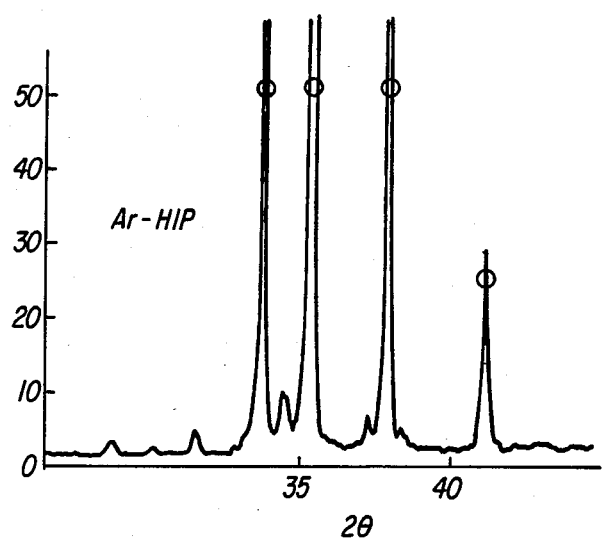
FIG. 1 is a diagram showing X-ray diffraction patterns of HIP-treated SiC, with a peak of $Si_3N_4$ in the case of $N_2$-HIP treatment.

In producing a sintered SiC by the method of the present invention, a sintering aid is added to SiC powder in the first stage in the same manner as in the case of $Si_3N_4$, and, after molding the mixture into a predetermined shape, it is preliminarily sintered to obtain a preliminarily sintered compact. The sintering aid for SiC may be the one or ones which are generally used for this purpose, including B and C, $Al_2O_3$, AlN, $Y_2O_3$, MgO, BeO, $B_4C$ and the like. The SiC powder which is added with one or more than one of these aids is formed into a shape by compression molding, injection molding, hydrostatic molding or other known molding methods.

The resulting green compact of a predetermined shape is then preliminarily sintered to produce a compact which is densified to a certain degree by the preliminary sintering or hot pressing. In this instance, the strength is not improved to any significant degree if the relative density attained by the preliminary sintering is less than 80%. Therefore, according to the method of the present invention, it is necessary for the preliminarily sintered product to have a density higher than 80%. In a case where the relative density is greater than 92%, the HIP treatment has an effect of improving the strength of the preliminary sintered compact by accelerating its densification in addition to the formation of $Si_3N_4$ rich layer, since the inner pores of the sintered product are not connected with its surface.

The preliminary sintering is normally carried out by an inert gas atmosphere method or a hot pressing method. However, as the lower limit of the relative density to be attained in this stage may be 80%, it is possible to employ various methods for this purpose. Namely, preliminarily sintered products of complicate shapes can be obtained easily by an ordinary simple sintering method.

In the next stage, the preliminarily sintered compact is charged into a HIP furnace as it is without sealing in a capsule, and processed into a sintered product by a HIP treatment in $N_2$ gas atmosphere.

With regard to the conditions of the HIP treatment, it has been experimentally proved that the preliminarily sintered compact should be treated at as high a temperature as possible in an $N_2$ gas atmosphere, more specifically, in a high-temperature and high-pressure $N_2$ gas atmosphere maintaining a pressure higher than 500 atms and a temperature in range of 1400°–2300° C.

Particularly, the HIP pressure is preferred to be higher than 1000 atms since a HIP treatment under a pressure lower than 500 would take a long time, resulting in coarsening of the SiC crystal grains with corresponding degradations in strength. Although a higher HIP pressure has a higher effect on the formation of the $Si_3N_4$ rich layer but an unduly high pressure is impractical in view of the time required for elevating the pressure to that level and the necessity for providing larger pressure equipments including the compressor and pressure container. Thus, a pressure in the range of 500–2500 atms is most practical.

On the other hand, the HIP temperature should be in the range of 1400°–2300° C. as mentioned hereinbefore, but a temperature in the range of 1700°–2100° C. is preferable from a practical point of view. If the HIP temperature is below 1400° C., the effect of improving the SiC strength becomes insufficient. On the contrary, a HIP temperature higher than 2300° C. should be avoided as it would induce the SiC decomposition reaction in a greater degree.

The temperature in the range of 1400°–2300° C. has another advantage in that the surfaces of the preliminarily sintered compact under treatment are decomposed to form surface layers of silicon nitride ($Si_3N_4$). More particularly, under the above-mentioned treating conditions, SiC on the surface of the preliminarily sintered compact is decomposed into Si and C, and reacts with $N_2$ gas in the high-pressure $N_2$ gas atmosphere, forming $Si_3N_4$ on the surface and releasing C in the form of CO gas as expressed by the following formulas.

$$3SiC + 2N_2 \rightarrow Si_3N_4 + 3C$$

$$2C + O_2 \rightarrow 2CO$$

The $Si_3N_4$ rich layer formed on the surface of SiC protects the interior of the sintered product and prohibits decomposition of SiC, contributing to the improvement of the density and strength of the sintered product. Therefore, the layer containing $Si_3N_4$ is preferred to be formed in a thickness of about 5–20 μm.

The furnace to be used in the above-described HIP treatment may be a known HIP equipment including a pressure container, a heat insulating layer and a graphite heater. Of course, it is possible to employ an improved HIP equipment for the method of the present invention.

If the HIP treatment is carried out in an Ar gas atmosphere instead of the above-described $N_2$ gas atmosphere, the sintered product is decomposed due to oxidation of SiC by $O_2$ which exists in a small amount in the Ar gas. It becomes difficult to obtain sintered product of high strength especially in a case where Si is oxidized into SiO which is gasified at high temperatures.

Figure 1B:
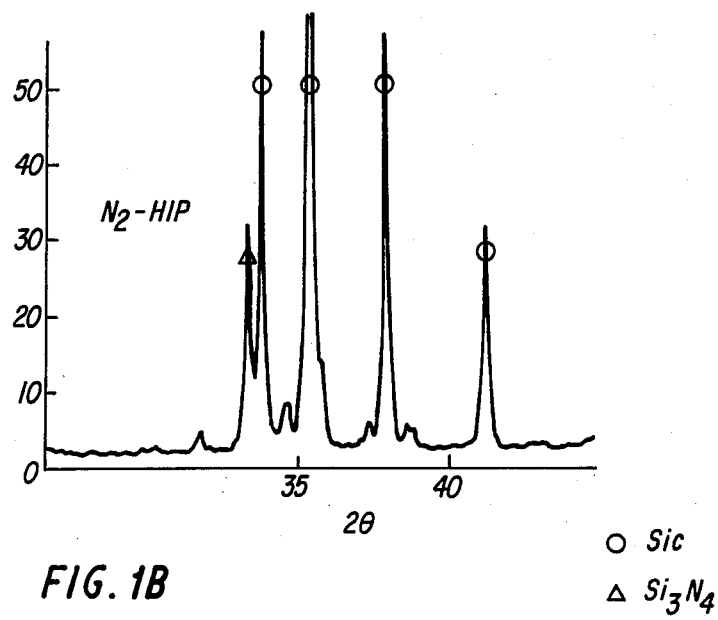
Figure 2A:
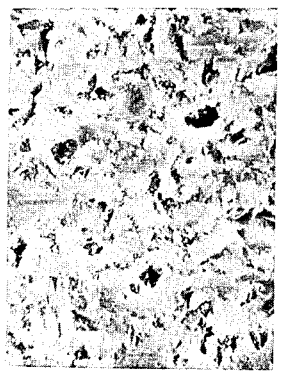
FIG. 2 shows SEM photographs of SiC surfaces (a) before HIP treatment, (b) after Ar-HIP treatment and (c) after $N_2$-HIP treatment, respectively.
Figure 2B:
Figure 2C:
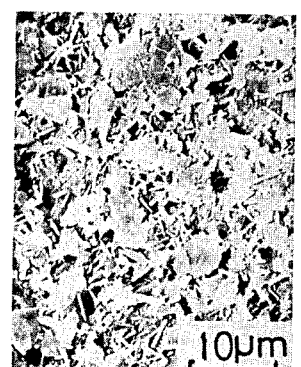

Referring to FIG. 1 of the accompanying drawing, there are shown X-ray diffraction patterns of SiC after a $N_2$-HIP treatment of 1850° C.×1 hr. and an Ar-HIP treatment of 1750°C.×1 hr. It will be clear therefrom that there is formed a surface layer of $Si_3N_4$ of about 10 microns in thickness in the case of the $N_2$-HIP treatment. The thickness of the $Si_3N_4$ rich surface layer is of course varied by suitably controlling the temperature or the time length of the HIP treatment depending upon the purpose for which the sintered products are intended to serve. As clear form the scanning electron microphotographs of FIG. 2, acicular $Si_3N_4$ is formed on the surface on SiC in the case of the $N_2$-HIP treatment.

As clear from the foregoing description, the method of the present invention essentially includes the steps of molding SiC powder into a green compact of a predetermined shape, preliminarily sintering the green compact and subjecting the preliminarily sintered compact to a HIP treatment in an $N_2$ gas atmosphere thereby to sinter the compact and simultaneously to form a $Si_3N_4$ layer on the surface of the sintered SiC product. Although the reason why the strength of SiC is increased by the $N_2$-HIP treatment is not entirely clarified at the present stage, it is assumed that at least either the formation of the $Si_3N_4$ layer itself or solid solution of N into the surface of SiC is contributive in this regard.

Since compacts of SiC powder are subjected to the HIP treatment after preliminary sintering in the method of the present invention, it is possible to produce sintered products of complicate shapes with ease. Besides, the SiC compacts may be subjected to the preliminary sintering before HIP treatment in such a way that a relative density of the preliminarily sintered compacts is 80% or higher, so that it is possible to employ various sintering methods in this invention. It follows that high strength sintered compacts of arbitrary complicated shapes can be produced easily. Nevertheless, needless to say, it is preferred to apply the method of the present invention to sintered compacts with a relative density higher than 92% at which open pores disappear, from the standpoint of producing sintered compacts of higher density and strength.

Further, the method of the present invention permits to carry out the HIP treatment without using a glass capsule or the like, so that it is free of the problems as encountered in the conventional methods in preparing glass capsules of complicated shapes or in filling the SiC powder uniformly in such capsules, as well as the troubles of sealing failures and fracturing of the glass capsules in the deforming stage. Furthermore, it is free of the cracking troubles of the sintered products which occur in a cooling stage subsequent to the HIP treatment due to a difference in thermal expansion coefficient between SiC and the glass capsule, or the problem of separating the sintered products form the capsules. Thus, the method of the present invention is extremely useful in industrial production processes and can greatly contribute to development of practical uses of SiC ceramics.

The method of the invention is illustrated more particularly by the following example.

EXAMPLE 1 wt% of B powder and 1 wt% of C powder were added respectively to commercially available SiC powder and mixed in acetone solvent for 10 hours by means of a ball mill. The dried mixture of the powders was then cold-formed, followed by preliminary sintering in Ar gas atmosphere for 3 hours at 2000° C. to produce preliminarily sintered compacts with a relative density of 92%. Each preliminarily sintered compact was put in a HIP furnace for HIP treatment in $N_2$ gas atmosphere under the conditions shown in Table 1 to obtain a sintered SiC product. On the other hand, for the purpose of comparison, a similar preliminarily sintered compact was subjected to HIP treatment in Ar gas atmosphere to obtain a HIP treated SiC sintered compact of a comparative sample. Table shows the results of the measurement of flexural strength of the respective sintered SiC products obtained.

TABLE 1

| Prelim. Sintering | | HIP Treatment | | | HIP'ed SiC | |
| --- | --- | --- | --- | --- | --- | --- |
| Density (g/cc) | Flexural strength at room temp. (kg/mm$^2$) | Temp. (°C.) | Press. (atm) | Press. medium | Density (g/cc) | Flexural strength at room temp. (kg/mm$^2$) |
| 3.14 | 47 | 1700 | 1000 | Ar | 3.15 | 43 |
|  |  | 1700 | 1000 | N$_2$ | 3.15 | 59 |
|  |  | 1900 | 1000 | N$_2$ | 3.15 | 57 |

As clear from Table 1, a slight improvement in the density of the SiC sintered compact is observed in all cases. However, in the case of HIP treatment in Ar gas atmosphere, the strength after the HIP treatment is rather lower than before the preliminarily sintering. In contrast, the SiC sintered compacts obtained by the HIP treatment in the $N_2$ gas atmosphere according to the method of the present invention show about 25% increase in strength, confirming the distinguished effect of the present invention.

What is claimed as new and intended to be secured by Letters Patent is:

1. A method for producing a high strength sintered silicon carbide, the method comprising:
    molding a mixture of silicon carbide powder and at least one sintering aid into a green compact of a predetermined shape;
    preliminarily sintering said green compact to obtain a preliminarily sintered compact having a relative density higher than 80%;
    charging said preliminarily sintered compact in a hot isostatic pressing equipment without using a capsule; and
    subjecting said preliminarily sintered compact to a hot isostatic pressing treatment in a high-temperature and high-pressure $N_2$ gas atmosphere maintaining a pressure higher than 500 atms and a temperature in the range of 1400°–2300° C. whereby said silicon carbide reacts with said $N_2$ to form a layer of silicon nitride.

2. A method for producing a high strength sintered silicon carbide as set forth in claim 1, wherein a layer containing silicon nitride ($Si_3N_4$) is formed in a thickness of 5–20 μm on a surface of sintered silicon carbide simultaneously with said hot isostatic pressing treatment.

3. A method for producing a high strength sintered silicon carbide as set forth in claim 1 or 2, wherein the pressure of said hot isostatic pressing treatment is in the range of 1000–2500 atms.

4. A method for producing a high strength sintered silicon carbide as set forth in claim 1, or 2, wherein the temperature of said hot isostatic pressing treatment is in the range of 1700°–2100° C.

5. A method for producing a high strength sintered silicon carbide as set forth in claim 3 wherein the temperature of said hot isostatic pressing treatment is in the range of 1700°–2100° C.

* * * * *